(12) United States Patent
Möschl

(10) Patent No.: US 11,896,980 B2
(45) Date of Patent: Feb. 13, 2024

(54) TEMPERATURE-CONTROLLED COMPONENT AND METHOD FOR THE PRODUCTION OF A TEMPERATURE-CONTROLLED COMPONENT

(71) Applicant: NETZSCH-Feinmahltechnik GmbH, Selb (DE)

(72) Inventor: Holger Möschl, Selb (DE)

(73) Assignee: NETZSCH-Feinmahltechnik GmbH, Selb (DE)

( * ) Notice: Subject to any disclaimer, the term of this patent is extended or adjusted under 35 U.S.C. 154(b) by 240 days.

(21) Appl. No.: 17/167,167

(22) Filed: Feb. 4, 2021

(65) Prior Publication Data

US 2021/0252521 A1 Aug. 19, 2021

(30) Foreign Application Priority Data

Feb. 14, 2020 (DE) .................. 10 2020 103 848.8

(51) Int. Cl.
| | |
|---|---|
| *F24H 9/06* | (2006.01) |
| *B02C 17/18* | (2006.01) |
| *B33Y 80/00* | (2015.01) |
| *B33Y 50/02* | (2015.01) |

(52) U.S. Cl.
CPC .......... *B02C 17/1815* (2013.01); *B33Y 50/02* (2014.12); *B33Y 80/00* (2014.12)

(58) Field of Classification Search
CPC .... B02C 17/1815; B02C 17/163; B02C 17/16
See application file for complete search history.

(56) References Cited

U.S. PATENT DOCUMENTS

2020/0224978 A1 * 7/2020 Horoszczak .............. F28F 1/40

FOREIGN PATENT DOCUMENTS

| DE | 3614721 A1 | | 11/1987 |
|---|---|---|---|
| JP | 2004306133 A | * | 11/2004 |
| JP | 2007326448 A | * | 12/2007 |
| WO | 2007042059 A1 | | 4/2007 |

* cited by examiner

*Primary Examiner* — Davis D Hwu
(74) *Attorney, Agent, or Firm* — Whitmyer IP Group LLC

(57) ABSTRACT

A temperature-controlled component and a method for producing a temperature-controlled component, the temperature-controlled component includes a base body including at least one hollow space, through which a temperature control medium can flow. It is provided that in a first region, a first wall thickness is formed between an inner jacket surface of the hollow space and a jacket surface of the base body, and that in a second region, a second wall thickness is formed between an inner jacket surface of the hollow space and a jacket surface of the base body. The second region is a wear region of the component, and the second wall thickness is larger than the first wall thickness in this wear region.

20 Claims, 3 Drawing Sheets

B-B

A-A

A-A

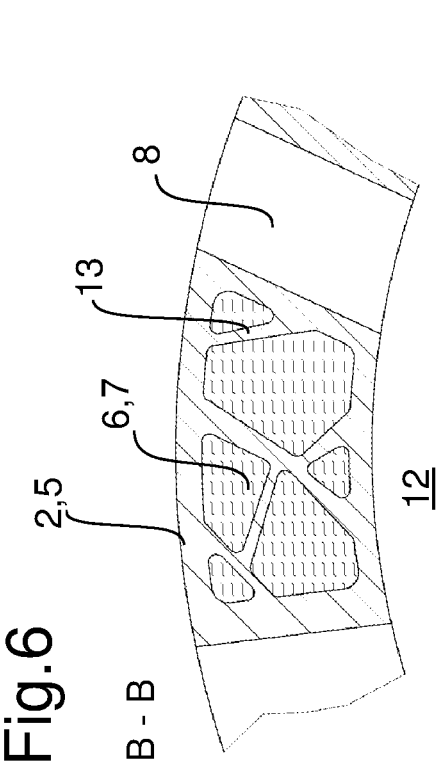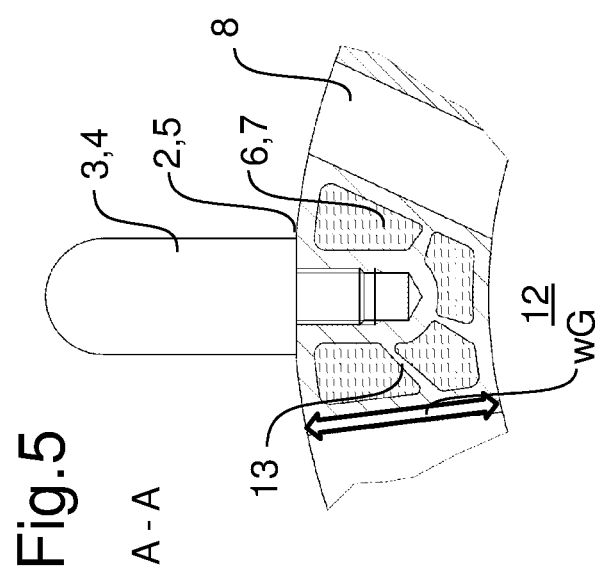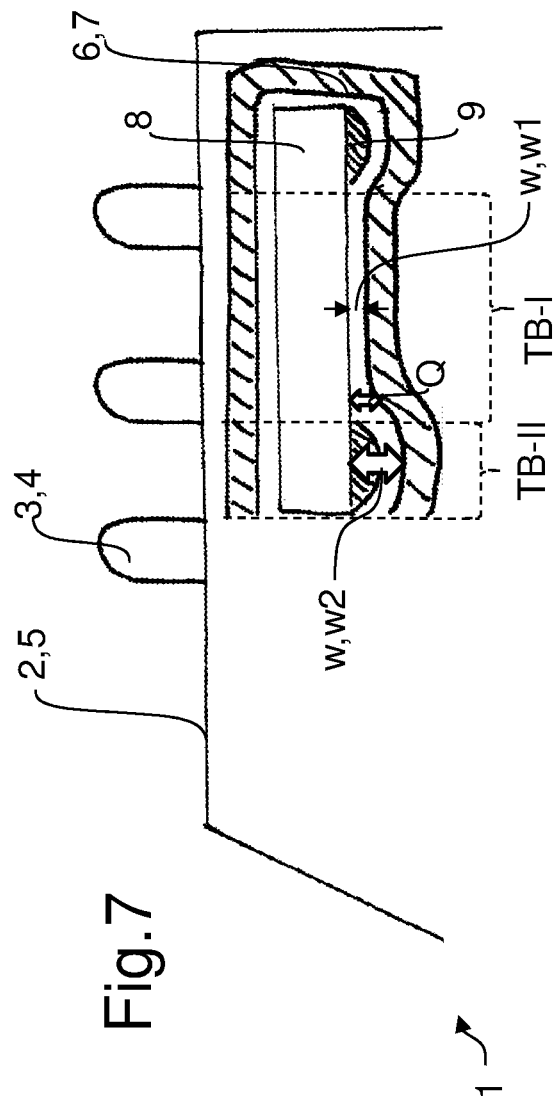

TEMPERATURE-CONTROLLED COMPONENT AND METHOD FOR THE PRODUCTION OF A TEMPERATURE-CONTROLLED COMPONENT

TECHNICAL FIELD

The present invention relates to a temperature-controlled component and a method for the production of a temperature-controlled component according to the features of the independent claims.

BACKGROUND

Many processes, in particular chemical, mechanical, or other processes, run by generating process heat, which can negatively influence the process flow itself or the utilized starting substances, respectively. In particular because for example the substances involved in the process are temperature-sensitive or because the temperature change impacts the process speed and thus makes an orderly process control more difficult. For this reason, it is common to stabilize a process flow in that for example the generated process heat is discharged by means of suitable cooling devices and/or cooling methods. In contrast, it may be advantageous for further processes, when they take place while heat is supplied.

Processes, which run in containers, are thereby mostly temperature controlled via the container wall, for example by means of cooling or cooling water or warm water pipes running along the wall or in that a further outer container, which is arranged radially spaced apart from the first container, is guided around the first container, so that a hollow space forms between the two containers, through which a fluid flow, which can be a warm water flow or a cooling medium flow, respectively, can be guided for the transport of the process heat.

The comminution process, for example, in agitator ball mills, represents an industrial process, in the case of which the heat creation can be particularly problematic. Depending on the product, this heat created during the processing has to be discharged or a heat formation has to be prevented, respectively. The problem generally exists in the case of all agitator ball mills, the problem is particularly pronounced in the case of agitator ball mills with a large grinding volume or when a higher power input is desired. For the cooling during the grinding process, it is provided, for example, to design the grinding cylinder and/or the agitator shaft to be coolable.

For example, the published application DE 3614721 A1 describes the equipping of the grinding container with a cooling jacket as known prior art. This document furthermore discloses that on its circumference, the agitator rotor can additionally be provided with at least one cooling duct. A grinding container comprising cooling jacket is furthermore shown in the published application WO 2007/042059 A1. The agitator mill described in this document furthermore has an inner stator, which can likewise be cooled. The agitator is formed in a pot-shaped manner and comprises an annular-cylindrical rotor.

It is problematic in particular that the components, which are to be temperature controlled, often represent a wear part. For example, the agitator shaft of agitator ball mills represents a wear part, which has to be replaced frequently in particular as a function of the processed grinding material. Due to the fact that the production of coolable agitator shafts is cost-intensive, this represents a significant cost factor for the operation of an agitator ball mill of this type.

SUMMARY

It is the object of the invention to produce a temperature-controllable component in a simple and cost-efficient manner, whereby in particular the service life of a component, which is subjected to wear, is increased, so that this component has to be replaced less frequently.

The above object is solved by means of a temperature-controlled component and a method for the production of a temperature-controlled component, which comprise the features in the independent patent claims. Further advantageous designs are described by the subclaims.

The invention relates to a temperature-controlled component and to a method for the production of a temperature-controlled component. The invention relates in particular to a coolable agitator shaft for the use in high-performance agitator ball mills.

The temperature-controlled component comprises a base body comprising at least one hollow space, through which a temperature control medium can flow. In a first region, a first wall thickness is formed between an inner jacket surface of the hollow space and a jacket surface of the base body, for example an outer jacket surface of the base body, and in a second region, at least a second wall thickness is formed between an inner jacket surface of the hollow space and a jacket surface or outer jacket surface of the base body. The second region is a so-called wear region, in which an in particular increased material removal occurs during operation. To increase the service life of the component, it is provided that compared to the first wall thickness, the second wall thickness between the hollow space and a jacket surface of the base body of the component is increased.

Prior to the planning and production of the component, at least one region is in particular determined, in which an increased wear of the component takes place. Suitable calculations can be made and/or used thereby. In the alternative, known wear spots can also be used for the component as part of the design considerations. The component is in particular conceptualized in such a way that different wall thicknesses are formed between a jacket surface of the component, which is subjected to a wear, and a temperature controllable hollow space of the component, as a function of the type and intensity of the wear, which is expected and/or known in different regions.

The hollow space preferably has a temperature control medium inlet, via which a suitable temperature control medium can be introduced. At least one temperature control medium outlet can furthermore be provided, via which the temperature control medium is discharged again. The temperature control medium can in particular serve for the cooling or the heating of the component as a function of the respective production process. Temperature control mediums are gaseous, liquid, or solid substances or substance mixtures, which are used for removing or for supplying heat. A suitably temperature-controlled fluid is preferably used as temperature control medium. For example, cold water is introduced into the at least one hollow space for the purpose of component cooling. In the alternative, warm or hot water or another substance or substance mixture with suitable temperature can also be used for the purpose of component cooling.

When the formation of the hollow space, through which temperature control medium can flow, is referred to below as cooling duct, through which a cooling medium flows, the description refers equally to temperature control ducts, through which a heating medium flows.

According to a preferred embodiment, the at least one hollow space, through which a temperature control medium can flow, is a temperature control duct, in particular a cooling duct. The cooling duct preferably has a first cross-sectional surface in the first wear-free or low-wear region, and a smaller second cross-sectional surface, which is in particular smaller than the first cross-sectional surface, in the second wear region. In the first wear-free or low-wear region, the cooling duct in particular has a first cross-sectional surface with a first circumference, and a second cross-sectional surface with a second circumference in the second wear region, wherein the second cross-sectional surface is smaller than the first cross-sectional surface, and wherein the second circumference is smaller than the first circumference. A particularly optimized cooling of the component thus takes place in the first region, because on the one hand, the cooling duct and thus the cooling medium run particularly close to the jacket surface of the component, which is to be cooled, and, on the other hand, because more cooling medium is available in the first region due to the enlarged first cross-sectional surface. In the case of the above-described embodiment, an enlarged cross-sectional surface also means an increased circumference and thus an increase of the surface area, against which the cooling medium flows, whereby the cooling of the component is improved. In the alternative, embodiments can be provided, which are formed in such a way that a smaller cross-sectional surface with an enlarged circumference is formed in some areas, so that the surface areas, against which the cooling medium flows, are likewise enlarged in the corresponding region.

An alternative embodiment can provide that the cooling duct has a largely constant cross-sectional surface over its entire length. It is in particular provided in this case that the cooling duct is arranged and/or formed section by section at corresponding distance from the jacket surface to be cooled, so that the above-described different wall thicknesses are in each case formed between the hollow space and the jacket surface of the base body. Corresponding connecting sections, which connect the cooling sections with the different wall thicknesses to one another, are arranged between the cooling sections.

To stabilize the hollow space, in particular the cooling duct, support structures can be arranged and/or formed at least section by section inside the hollow space. Support structures, which preferably extend from an inner jacket surface of the hollow space to a further inner jacket surface of the hollow space, in particular to an opposite inner jacket surface, are particularly preferably formed at least in the first low-wear or wear-free region.

In the alternative or in addition, support structures can be used in particular in regions, in which rising bending forces and torsional forces act on the component. For example, in the case of an agitator shaft of an agitator ball mill there are in each case partial regions, in which the wear is low because the grinding bodies do not rub so strongly against the surface or pound on the latter, respectively, in these partial regions for operational reasons. However, these partial regions can be subjected to high stresses. The stresses can be, for example, bending and/or torsional stresses. To counteract them, the partial regions can additionally be reinforced by support structures formed inside the hollow spaces.

According to one embodiment, first support structures are formed in the first low-wear or wear-free region, and second support structures are formed in the second wear region. The first support structures and the second support structures can be formed identically or essentially identically, whereby the first support structures are formed correspondingly longer in the case of an enlarged cross-sectional surface in the first region. A further embodiment can provide that the number of first support structures in the first region is higher than the number of second support structures in the wear region, because at least initially there is optionally no or hardly any need for support due to the increased wall thickness in the second region. In the alternative or in addition, the shape and/or stability of the first support structures can differ from or be identical to the shape and stability of the second support structures, as needed and depending on the type of application. The support structures can extend essentially linearly through the hollow space or can also have a non-linear shape, for example the support structures can have branches, have a honeycomb-shaped structure, or the like. The number and/or the shape of the support structures can thereby be determined and/or optimized by means of FEM calculations, the number and/or shape of the support structures can in particular be determined and optimized separately for each wear region.

The number and/or the shape of the first support structures and/or of the second support structures is preferably optimized in such a way that the temperature control of the component is optimized, in particular by means of a suitable flow guidance of the temperature control medium inside the at least one hollow space.

Due to the use of inner support structures, the wall thickness can be further reduced in particular in the first low-wear or wear-free regions, whereby in particular the heat transfer of the temperature control medium and thus the temperature control of the component is optimized, in particular the cooling of the component. In addition, the surface against which the temperature control medium flows is increased by means of the support structures, which likewise has a positive impact on the temperature control of the component. In addition, the support structures represent obstacles for the temperature control medium flow and lead to turbulent flows of the temperature control medium inside the temperature control duct. In conventionally known cooling ducts, the cooling medium in particular moves predominantly in a laminar flow. A laminar flow stands at the inner wall surface and forms an insulating layer to the cold cooling medium, which flows past. Turbulences are created due to the support structures, whereby the cooling medium flow is brought into a turbulent flow, which effects an improved cooling of the inner surface and further improves the temperature control.

According to a further embodiment, at least a third region can be provided, in the case of which structural elements are integrated in the wall enclosing the hollow space. It is provided, for example, that a third wall thickness is formed in the area between an inner jacket surface of the hollow space and a jacket surface of the base body of the component. The third wall thickness is larger than the first wall thickness. The third wall thickness can essentially correspond, for example, to the second wall thickness. Further embodiments can provide that the third wall thickness is larger than the second wall thickness. An alternative embodiment, in contrast, can provide that the third wall thickness is formed to be larger than the first wall thickness, but smaller than the second wall thickness.

The third region can be a wear region. However, the third region is generally rather a low-wear region. The fastening of further component parts to the component is provided in particular in the third region. The third region will thus also be referred to below as fastening region. It can be provided, for example, that a threaded hole is introduced into the component in the fastening region, in order to arrange the further component part or at least one further structural element to the component by means of a screw connection. The third wall thickness is thereby selected in such a way that it is higher than the length of the threaded hole, so that the screw connection does not protrude into the hollow space and thus creates a leaky spot, via which temperature control medium could escape from the hollow space in the case of insufficient sealing.

Due to the increased third wall thickness, the cross-sectional surface in the third region can be reduced as compared to the cross-sectional surface in the first and/or in the second region. The cross-sectional surface preferably has turned-in portions, a folded structure, or the like, so that the circumference of the cross-sectional surface is identical or even increased as compared to a circumference of the cross-sectional surface in the first and/or in the second region. An enlarged circumference leads to an increase of the surface area, against which the cooling medium flows, whereby the cooling of the component in the third region is improved. The operative area compared to the grinding chamber, in particular compared to the grinding zone in the grinding chamber located between the rotor and inner wall of the container is crucial, because the largest heat development prevails here.

The temperature-controlled component is preferably a component of an agitator ball mill or of a ball mill, in particular an agitator shaft or a grinding disk or a wear disk at a grinding chamber wall of the agitator ball mill or ball mill, or a grinding container of the agitator ball mill or ball mill.

The component is preferably produced by means of 3D printing. Particularly preferably it is provided to produce the component in one piece. The component comprising the internal temperature control structures, the cross-sectional surface of which changes over the length of the temperature control structures and/or the course of which is not formed linearly over the length of the temperature control structures, can be produced in a simple and cost-efficient manner by means of the 3D printing process in a single process step. The production costs compared to conventional methods, such as, for example injection molding methods, or the like, are thus significantly reduced. In particular due to the fact that the conventional methods require a finishing. For example, temperature control ducts can only be created by means of a subsequent introduction of holes. In addition, the range of shapes of the temperature control ducts, which can be produced thereby, is limited, and the formation of internal support structures is also not easily possibly.

Particularly preferably, the component is made of a metallic material by means of 3D printing. It can optionally be provided to additionally harden the component following the 3D printing, for example by means of conversion hardening, by means of precipitation hardening, or by means of cold hardening, in order to increase the strength and stability of the component.

According to one embodiment, the component is made of a ceramic material by means of 3D printing, for example of silicon carbide (SiC), of silicon carbide with free silicon (SiSiC), of silicon nitride, of zirconium oxide, or of mixed ceramic materials. The use of heat-conductive plastics would furthermore be possible. A 3D printing with at least two different materials could also take place in such a way that the component essentially consists of a first material, whereby the inner jacket surfaces and/or outer jacket surfaces of the component consist for example at least in some areas of a second material or are covered by a second material. For example, the component could essentially consist of a metal, in particular steel, whereby the inner jacket surfaces and/or outer jacket surfaces of the component are coated at least in some areas, for example by a plastic layer, for example polyurethane.

It should be expressly mentioned at this point that all aspects and embodiment alternatives, which were described in connection with the device according to the invention, can equally relate to or can be partial aspects of the method according to the invention. When reference is thus made to certain aspects and/or contexts and/or effects at a point in the description or also in the claim definitions relating to the device according to the invention, this thus applies equally for the method according to the invention. The same applies vice versa, so that all aspects and embodiment alternatives, which were described in connection with the method according to the invention, can equally relate to or can be partial aspects of the device according to the invention. When reference is thus made to certain aspects and/or contexts and/or effects at a point in the description or also in the claim definitions relating to the method according to the invention, this applies equally for the device according to the invention.

BRIEF DESCRIPTION OF THE DRAWINGS

Below, exemplary embodiments are to describe the invention and its advantages in more detail on the basis of the enclosed figures. The size ratios of the individual elements to one another in the figures do not always correspond to the actual size ratios, because some shapes are illustrated in a simplified manner, and other shapes are illustrated in an enlarged manner compared to other elements for the sake of clarity.

FIG. 5 shows a sectional illustration of a third embodiment of an agitator shaft according to FIG. 1 along the sectional line A-A.

FIG. 6 shows a sectional illustration of the third embodiment of an agitator shaft according to FIG. 1 along the sectional line B-B.

FIG. 7 shows an alternative embodiment of an agitator shaft.

DETAILED DESCRIPTION

Figure 1:
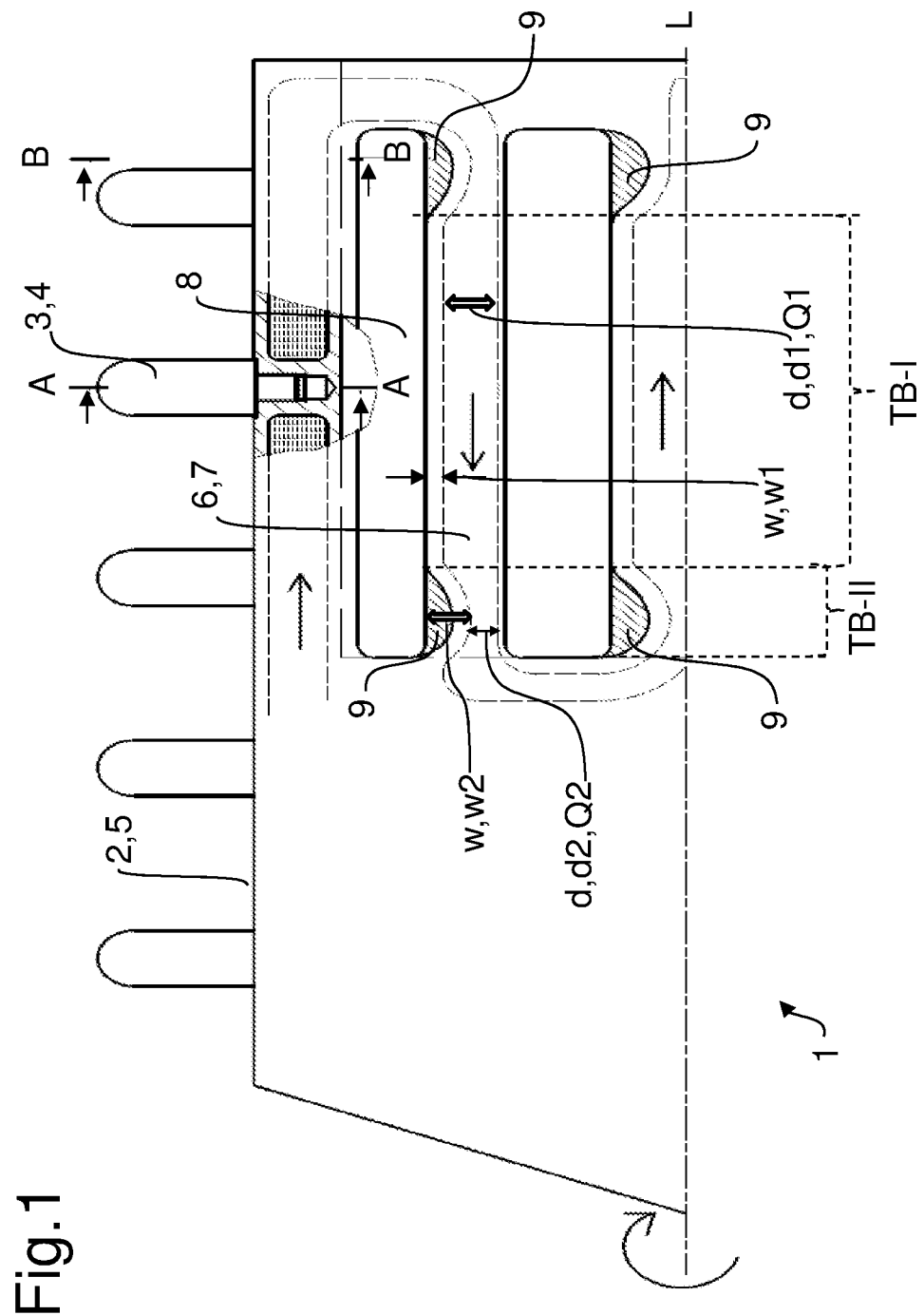
FIG. 1 shows a schematic longitudinal sectional illustration of an agitator shaft.

Identical reference numerals are used for elements of the invention, which are the same or which have the same effect. For the sake of clarity, only reference numerals, which are required for the description of the respective figure, are further illustrated in the individual figures. The illustrated embodiments only represent examples for how the device according to the invention or the method according to the invention can be designed, and do not represent a final limitation.

Figure 3:
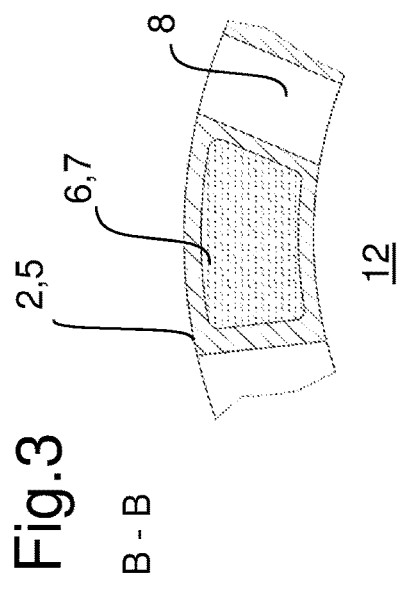
FIG. 3 shows a sectional illustration along the sectional line B-B of the agitator shaft from FIG. 1.
Figure 2:
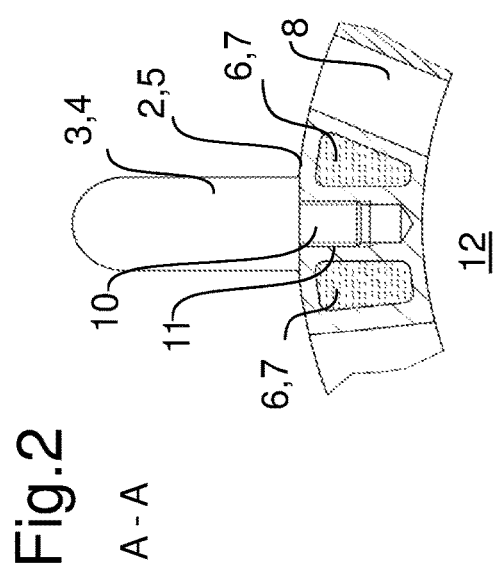
FIG. 2 shows a sectional illustration along the sectional line A-A of the agitator shaft from FIG. 1.

FIG. 1 shows a schematic longitudinal sectional illustration of a temperature-controlled component in the shape of an agitator shaft 1, as it is used in particular as agitator in an agitator ball mill. FIG. 2 shows a sectional illustration along the sectional line A-A of the agitator shaft from FIG. 1, and FIG. 3 shows a sectional illustration along the sectional line B-B of the agitator shaft from FIG. 1.

An agitator ball mill consists of a vertically or horizontally arranged, mostly approximately cylindrical grinding container, between 70% and 90% of which is filled with auxiliary grinding bodies. During the grinding process, the product to be ground flows continuously from a product inlet axially through the grinding chamber to a product outlet. The suspended solids are thereby comminuted or dispersed, respectively, between the auxiliary grinding bodies by means of impact and shearing forces. The separation of the auxiliary grinding bodies from the product flow then takes place in an outlet region. The discharge is a function of the design and takes place, for example, through a screen at the mill end.

The agitator is formed by the agitator shaft 1, which serves the purpose of rotating the agitator elements 3, which can alternatively also be formed in the shape of disks or the like. The solids of the grinding material, which are dispersed in liquid, are thereby deagglomerated and comminuted.

The agitator shaft 1 has a cylindrical base body 2 comprising a longitudinal axis L and an outer jacket surface 5, wherein agitator elements 3, in particular stirring rods 4, are arranged on the outer jacket surface 5 of the cylindrical base body 2. Together, the outer surfaces of the stirring rods 4 and the regions of the outer jacket surface 5 of the cylindrical base body 2, which are not covered by stirring rods 4, form an outer jacket surface of the agitator shaft 1. The agitator elements 3 are arranged in several rows, in particular in each case in alignment, at the outer jacket surface 5 of the cylindrical base body 2, wherein the rows are preferably arranged and/or formed parallel to the longitudinal axis L of the agitator shaft 1. In the alternative, the agitator elements 3 can also be arranged offset to one another at the outer jacket surface 5 of the cylindrical base body 2. It is provided according to a further embodiment that the agitator elements 3 are arranged in helical arrangement at the outer jacket surface 5 of the cylindrical base body 2 so as to wind around the longitudinal axis L of the agitator shaft 1.

It is preferably provided that the agitator shaft 1 is formed in one piece and consists, for example, of a metal material or of a ceramic material or of another suitable material. Particularly preferably, the agitator shaft 1, in particular the base body 2 together with the agitator elements 3, is made of the corresponding material by means of a single method step. Particularly preferably, a 3D printing method is used for this purpose, because hollow spaces 6 can also be created inside the base body 2 of the agitator shaft 1 by means of this method in a single method step.

The agitator shaft 1 is preferably formed to be hollow at least in some regions, the agitator shaft 1 preferably has a coaxial hollow interior region 12 (see FIGS. 2 and 3). The agitator shaft 1 furthermore has passage openings 8 at least in some regions between the hollow interior region 12 and the outer jacket surface 5 of the cylindrical base body 2 of the agitator shaft 1. A separating device and the product outlet are arranged inside the hollow interior region 12. The auxiliary grinding bodies are separated from the ground product by means of the separating device. While the comminuted product can be discharged via the product outlet, the auxiliary grinding bodies and optionally grinding material, which has not been sufficiently comminuted yet, are returned back into a grinding zone inside the grinding chamber of the agitator ball mill, which is located between the outer jacket surface 5 of the cylindrical base body 2 of the agitator shaft 1 and the inner jacket surface of the grinding container of the agitator ball mill, via the passage openings 8.

Between the hollow interior region 12 and the outer jacket surface 5 of the cylindrical base body 2, the agitator shaft 1 furthermore has further hollow spaces 6 for temperature controlling the agitator shaft 1, in particular for cooling the agitator shaft 1. The cooling is necessary, because process heat is created during the comminution process, which can negatively influence the process flow itself or the used starting substances, respectively, because, for example, the substances involved in the process are temperature-sensitive or the temperature change affects the process speed and thus makes an orderly process control more difficult. Depending on the product, this heat has to be discharged or a heat formation has to be prevented, respectively. The amount of heat to be discharged is correspondingly high in particular in the case of agitator ball mills with a large grinding volume or in the case of high power input.

The process flow is stabilized by cooling the agitator shaft 1. The cooling of the agitator shaft 1 is effected in that a cooling medium is introduced into the at least one hollow space 6 of the agitator shaft 1 or in that a cooling medium is guided through the at least one hollow space 6 of the agitator shaft 1. The cooling medium thereby absorbs heat and discharges it. The at least one hollow space 6 is preferably formed as cooling duct 7, which extends parallel to the longitudinal axis L of the agitator shaft 1. According to the illustrated embodiment, it is provided that cooling ducts 7 extend in particular parallel to the longitudinal axis L of the agitator shaft and parallel to the passage openings 8, which extend in a parallel axial manner.

Due to the contact with the grinding material and the auxiliary grinding bodies, the agitator shaft 1 of an agitator ball mill or ball mill is subjected to a permanent wear. (Partial) regions TB-II exist thereby, in which the wear is particularly high, for example (partial) regions TB-II between the agitator elements 3, at which turbulences of the auxiliary grinding body-grinding material mixture take place, so that it hits the agitator shaft 1 with increased speed and/or so that the contact frequency with the agitator shaft 1 is increased.

Particularly wear-prone regions TB-II are located, for example, at the edge regions of the passage openings 8. In the present example, the wear regions 9 are identified by means of shading. In the case of the invention described here it is provided that the agitator shaft 1 is optimized in such a way that during the production of the agitator shaft 1 a higher wall thickness w2 is formed between the hollow space and the outer jacket surface 5 of the cylindrical base body 2 of the agitator shaft 1 in the regions TB-II, in which a higher wear is present, so that more material is available, which can be removed by the wear. Due to the partially increased wall thickness w2, the service life of the agitator shaft 1 is increased, i.e. the agitator shaft 1 has to be replaced less frequently. A wall thickness w in (partial) regions TB-I, in which no or only slight wear takes place, can simultaneously be designed to be as thin as possible, so as to thus optimize the heat transfer from the outer jacket surface 5 of the agitator shaft 1 to the cooling medium.

According to one embodiment, the cooling duct 7 has different inner diameters d in some regions. This results in that the cooling duct 7 thus has cross-sectional surfaces Q, which are formed differently in some regions and which are in particular of different sizes. It is provided that the cooling duct 7 has a first diameter d1 in a first (partial) region TB-I, so that a first wall thickness w1 is formed between an inner jacket surface of the cooling duct 7 and the passage opening 8. The first diameter d1 results in a first cross-sectional surface Q1 of the cooling duct. It is furthermore provided that the cooling duct 7 has a second diameter d2 in a second (partial) region TB-II, which in particular corresponds to the wear region 9, and, resulting therefrom, a second cross-sectional surface Q2, so that a second wall thickness w2 is formed between an inner jacket surface of the cooling duct 7 and the passage opening 8. The first cross-sectional surface Q1 is in particular larger than the second cross-sectional surface Q2, and the second wall thickness w2 is at least initially higher than the first wall thickness w1. The agitator shaft 1 thus has an increased wall thickness w2 at least prior to the first use in the wear regions 9. Due to the use of the agitator shaft 1, the latter is subjected to the normal wear processes. Due to the use, the material, of which the agitator shaft 1 consists, is gradually removed in the corresponding wear regions 9, so that the wall thickness w in the wear regions 9 decreases with increasing duration of use. The wall regions w1 in the (partial) regions TB-I are thereby subjected to a lower wear than the wall regions w2 in the (partial) regions TB-II.

Due to the fact that an at least initially increased second wall thickness w2 of material is provided in the wear regions 9 compared to the first (partial) regions TB-I with less or with reduced wear, respectively, the agitator shaft 1 has a higher service life than an agitator shaft, in the case of which the initial wall thickness w between cooling duct 7 and outer jacket surface 5 of the cylindrical base body 2 of the agitator shaft is formed to be equally strong everywhere. In addition, the wall thickness w1 in the first (partial) regions, in which only a low wear takes place, can optionally be further reduced and can in particular be designed to be very thin, whereby the cooling effect of the agitator shaft 1 can be increased and optimized.

According to one embodiment in particular, the cooling ducts 7 are widened in particular in partial regions, in which little or no wear, in particular little or no material abrasion, are to be expected at the agitator shaft 1, so that particularly small, optimized wall thicknesses w1 can be used in these partial regions. The wall thickness w has a direct impact on the heat transfer to the cooling medium in the cooling ducts 7. The larger the wall thickness w. the smaller the heat transfer into the cooling medium. Low wall thicknesses w between cooling duct 7 and outer jacket surface of the agitator shaft 1 are to thus be preferred.

However, (partial) regions TB-I, in which the wear is low, because the grinding bodies do not rub so strongly against the surface or pound on the latter, respectively, in these (partial) regions TB-I for operational reasons, can also be subjected to high stresses. The stresses can be, for example, bending and/or torsional stresses. To be able to withstand these stresses even or in particular in connection with small wall thicknesses w, such (partial) regions TB-I can additionally be reinforced by support structures located on the inside. The reinforcing structures can be, for example, support structures 13 inside the cooling ducts 7, as they will be described below in connection with FIGS. 5 and 6.

The cooling duct 7 can also have a different shape, in particular a non-linear shape. The cooling duct 7 can be formed, for example, in a meander shape or spiral shape. Cooling ducts designed in this way can also run along wear-intensive (partial) regions TB-I and low-wear (partial) regions TB-II. The design with wall regions of different thicknesses according to the above description can also be applied in an advantageous manner in the case of these cooling ducts. Corresponding embodiments are obvious for the person of skill in the art due to the disclosure in the present description and are also captured by the scope of protection of the following patent claims.

In the case of the agitator shaft 1 described here, the agitator elements 3 are formed as stirring rods 4 and are fastened to the base body 2 via a screw connection 10. For this purpose, threaded holes 11 are in particular introduced into the base body 2. A cooling of the agitator shaft 1 is usually not provided in the fastening region. According to the embodiment described below, the threaded hole 11 is enclosed by the cooling duct 7.

Figure 4:
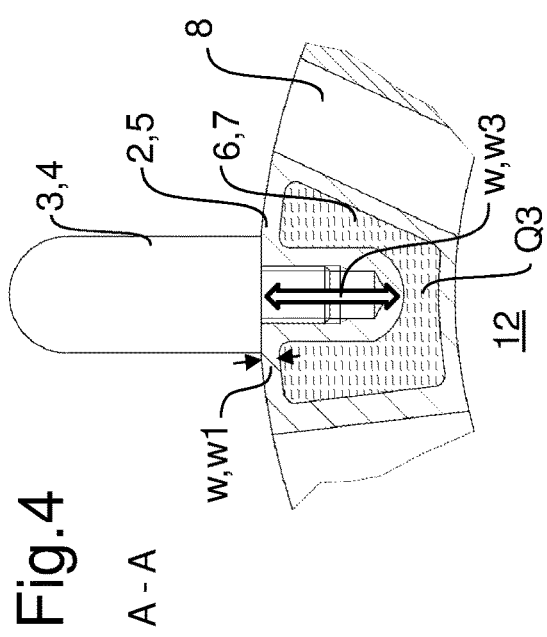
FIG. 4 shows a sectional illustration of a second embodiment of an agitator shaft according to FIG. 1 along the sectional line A-A.

FIG. 4 shows a sectional illustration of a second embodiment of an agitator shaft according to FIG. 1 along the sectional line A-A. It is provided hereby that the fastening region for the agitator elements 3 provide a third (partial) region, in which a third wall thickness w3, which is in particular larger than the first wall thickness w1 and optionally is also larger than the second wall thickness w2 described in connection with FIG. 1, is formed between the cooling duct 7 and the surface of the cylindrical base body 2. The fastening of the agitator element 3 is thus integrated into the wall, which encloses the hollow space 6 or cooling duct 7 and which thus has to have a correspondingly increased third wall thickness w3.

It can be provided, for example, that a threaded hole 11 is introduced into the agitator shaft in the fastening region, in order to arrange the agitator element 3 at the agitator shaft by means of a screw connection 10. The third wall thickness w3 is thereby selected in such a way that it is higher than the length of the threaded hole 11, so that the screw connection 10 does not protrude into the hollow space and thus creates a leaky spot, via which temperature control medium could escape from the hollow space 6 in the case of insufficient sealing. In the region of the increased wall thickness, the cooling duct has a reduced third cross-sectional surface Q3.

Even though the third cross-sectional surface Q3 is smaller, the cooling duct 7 has an increased circumference in the region of the third cross-sectional surface Q3. The increased circumference effects an enlarged surface area, against which the cooling medium flows, whereby the cooling of the component is improved in this third region. The operative area compared to the grinding chamber, in particular compared to the grinding zone in the grinding chamber located between the agitator shaft and inner wall of the grinding container is crucial, because the largest heat development prevails here.

FIG. 5 shows a sectional illustration of a third embodiment of an agitator shaft 1 according to FIG. 1 along the sectional line A-A, and FIG. 6 shows a sectional illustration of the third embodiment of an agitator shaft 1 according to FIG. 1 along the sectional line B-B.

In particular, a cross-section through an agitator shaft 1 formed as hollow shaft comprising a hollow interior region 12 is illustrated. Between the hollow interior region 12 and the outer jacket surface 5, the agitator shaft 1 has a total wall thickness wG. The agitator shaft, which is formed as hollow shaft at least in some regions, is not made of a solid material, but is honeycombed with at least one hollow space 6, for example a cooling duct 7. Support structures 13 are arranged and/or formed at least in some regions inside the hollow space 6. The support structures 13 serve in particular to stabilize the agitator shaft 1 in the region of reduced wall thicknesses w, w1. The use of support structures 13 in particular provides for the formation of particularly small wall thicknesses w1, whereby the heat transfer into the cooling medium is optimized. In addition, the surface, against which the cooling water flows, is increased by means of the support structures 13, whereby the cooling of the agitator shaft 1 can be further improved. Turbulent flows are furthermore created inside the cooling duct 7 by means of the support structures 13. In contrast to cooling ducts, which are formed by holes with a uniform diameter along their length and in which only laminar flows occur, the occurrence of turbulences and turbulent flows is effected by means of the support structures 13, and the cooling is thus further improved. For example, the support structures 13 can extend radially to the longitudinal axis L of the agitator shaft 1. It can be provided in the alternative that the support structures have a honeycomb-like structure or the like.

The cooling ducts 7 described in connection with FIGS. 1 to 6 are in particular adapted to an expected wear of the component. When producing the component, an increased wall thickness w2 is formed between the hollow space 6 or cooling duct 7 and a jacket surface of the component, in particular between the outer jacket surface 5 of the base body 2 of the component, in the regions TB-II, in which a high wear is to be expected. The hollow space 6 or cooling duct 7 is accordingly formed to be constricted in this wear region 9, TB-II. In contrast, particularly thin wall thicknesses w1 are formed between the hollow space 6 or cooling duct 7 and the outer jacket surface 5 of the component or of the base body 2 of the component in regions TB-I, in which only a low (normal) wear is to be expected, in order to optimize the temperature control. The hollow space 6 or cooling duct 7 is in particular widened in the low-wear or largely wear-free region TB-I.

An alternative embodiment according to FIG. 7 can provide that the hollow space 6 or cooling duct 7 has always formed a largely identical cross-sectional surface Q along its length. In this case, however, the cooling duct 7 is not formed linearly. Instead, the cooling duct 7 has a winding shape, so that the cooling duct 7 runs particularly close to the corresponding outer jacket surface 5 of the component in the low-wear or largely wear-free (partial) regions TB-I, so that only a small wall thickness w1 is formed. Instead, the cooling duct 7 first has a larger distance to the corresponding outer jacket surface 5 of the component in the wear regions 9, TB-II, so that a larger wall thickness w2 is formed. Material of the component is removed in the wear regions 9, TB-II by means of the signs of wear during the ongoing production operation, so that the wall thickness w decreases in these regions 9, TB-II. When the wall thickness w in these regions 9, TB-II becomes too small, in particular when the wall thickness w in these regions fall to a value of below of the wall thickness w1, the agitator shaft 1 has to be replaced.

The embodiments, examples, and alternatives of the preceding paragraphs, the claims or the following description and the figures, including the different views thereof or respective individual features, can be used independently of one another or in any combination. Features, which are described in combination with one embodiment, can be used for all embodiments, unless the features are incompatible.

Although reference is generally made to "schematic" illustrations and views in connection with the figures, this does by no means suggest that the figure representations and the description thereof are to be of secondary importance with regard to the disclosure of the invention. The person of skill in the art is in fact able to gather sufficient information, which make it easier for him to understand the invention, from the illustrations, which are shown in a schematic and abstract manner, without affecting his understanding in any way, for instance from the drawn and possibly not exactly true-to-scale size ratios of the individual articles and/or parts of the device or other drawn elements. The figures thus make it possible for the person of skill in the art, as the reader, to gain a better understanding for the idea of the invention, which is worded in a more general and/or more abstract way in the claims as well as in the general part of the description, based on the concretely described implementation of the method according to the invention and of the concretely described mode of operation of the device according to the invention.

The invention was described with reference to a preferred embodiment. However, it is conceivable for a person of skill in the art that modifications or changes to the invention can be made, without thereby leaving the scope of protection of the following claims.

The invention claimed is:

1. A temperature-controlled component comprising:
   a base body including at least one hollow space, through which a temperature control medium can flow, the base body having an outer jacket surface on which agitator elements are arranged,
   wherein in a first region, a first wall thickness is formed between an inner jacket surface of the hollow space and the outer jacket surface of the base body,
   wherein in a second region, a second wall thickness is formed between the inner jacket surface of the hollow space and the outer jacket surface of the base body,
   wherein the second region is a wear region in which increased material removal of the base body occurs during operation, and wherein the second wall thickness is larger than the first wall thickness;
   wherein the base body is designed as a single 3D-printed piece.

2. The temperature-controlled component according to claim 1, wherein the hollow space, through which a temperature control medium can flow, is a temperature control duct, in particular a cooling duct, wherein the temperature control duct has a first cross-sectional surface in the first region, and wherein the temperature control duct has a second cross-sectional surface in the second region, wherein the second cross-sectional surface is smaller than the first cross-sectional surface.

3. The temperature-controlled component according to claim 1, wherein support structures are arranged and/or formed at least section by section inside the hollow space.

4. The temperature-controlled component according to claim 1, wherein first support structures are formed in the first region, and/or wherein second support structures are formed in the second region.

5. A temperature-controlled component comprising a base body including at least one hollow space, through which a temperature control medium can flow,
   wherein in a first region, a first wall thickness is formed between an inner jacket surface of the hollow space and a jacket surface of the base body,
   wherein in a second region, a second wall thickness is formed between an inner jacket surface of the hollow space and a jacket surface of the base body,
   wherein the second region is a wear region, wherein the second wall thickness is larger than the first wall thickness, and
   wherein in a third region, a third wall thickness is formed between an inner jacket surface of the hollow space and a jacket surface of the base body, wherein the third wall thickness is larger than the first wall thickness or wherein the third wall thickness is larger than the second wall thickness.

6. The temperature-controlled component according to claim 5, wherein the third region is a fastening region, and wherein a fastening means is formed or arranged in the third region, in particular wherein the fastening means is formed by means of a threaded hole.

7. The temperature-controlled component according to claim 1, wherein a temperature control medium inlet and a temperature control medium outlet is assigned to the temperature-controllable hollow space.

8. The temperature-controlled component according to claim 1, wherein it is a component of an agitator ball mill or of a ball mill, in particular an agitator shaft or a grinding disk or a wear disk at a grinding chamber wall of the agitator ball mill or ball mill, or a grinding container of the agitator ball mill or ball mill.

9. The temperature-controlled component according to claim 1, wherein it is a component produced by means of 3D printing.

10. A method for producing a temperature-controlled component, comprising:
  providing a base body having at least one hollow space and an outer jacket surface on which agitator elements are arranged, the at least one hollow space being configured to receive a temperature control medium and provide fluid flow of the control medium through the base body,
  determining at least one region of the base body to be a wear region in which an increased material removal of the component occurs during operation of the component,
  wherein in a first region, a first wall thickness is formed between an inner jacket surface of the hollow space and the outer jacket surface of the base body,
  wherein in the wear region, a second wall thickness is formed between the inner jacket surface of the hollow space and the jacket surface of the base body,
  wherein the second wall thickness is larger than the first wall thickness,
  wherein at least the base body is designed as a single piece.

11. The method according to claim 10, wherein support structures are formed and/or arranged inside the hollow space, in particular wherein a first number of first support structures are formed and/or arranged in the first region, and/or wherein a second number of second support structures is provided and/or arranged in the second region.

12. The method according to claim 11, wherein the first support structures and/or the second support structures are optimized in such a way that the temperature control of the component is optimized, in particular by means of a suitable flow guidance inside the hollow space.

13. The method according to claim 10, wherein the component is produced by means of 3D printing.

14. The temperature-controlled component according to claim 2, wherein in a third region, a third wall thickness is formed between an inner jacket surface of the hollow space and a jacket surface of the base body, wherein the third wall thickness is larger than the first wall thickness or wherein the third wall thickness is larger than the second wall thickness.

15. The method according to claim 11, wherein the component is produced by means of 3D printing.

16. The temperature-controlled component according to claim 1, wherein the agitator elements are stirring rods that extend outward from the outer jacket surface of the base body.

17. The temperature-controlled component according to claim 1, wherein the base body has a longitudinal axis around which the base body is rotatable.

18. The temperature-controlled component according to claim 1, wherein the hollow space has a diameter which changes in different regions along a length of the base body.

19. The temperature-controlled component according to claim 1, wherein the base body includes a hollow interior region extending along a longitudinal axis of the base body, wherein the at least one hollow space is positioned between the hollow interior region and the outer jacket surface of the base body.

20. The temperature-controlled component according to claim 19, wherein the base body includes at least one passage opening between the hollow interior region and the outer jacket surface, wherein the at least one passage opening extends in parallel with the at least one hollow space, wherein the at least one passage opening being configured to provide passage for movement of material.

* * * * *